Figure 1:
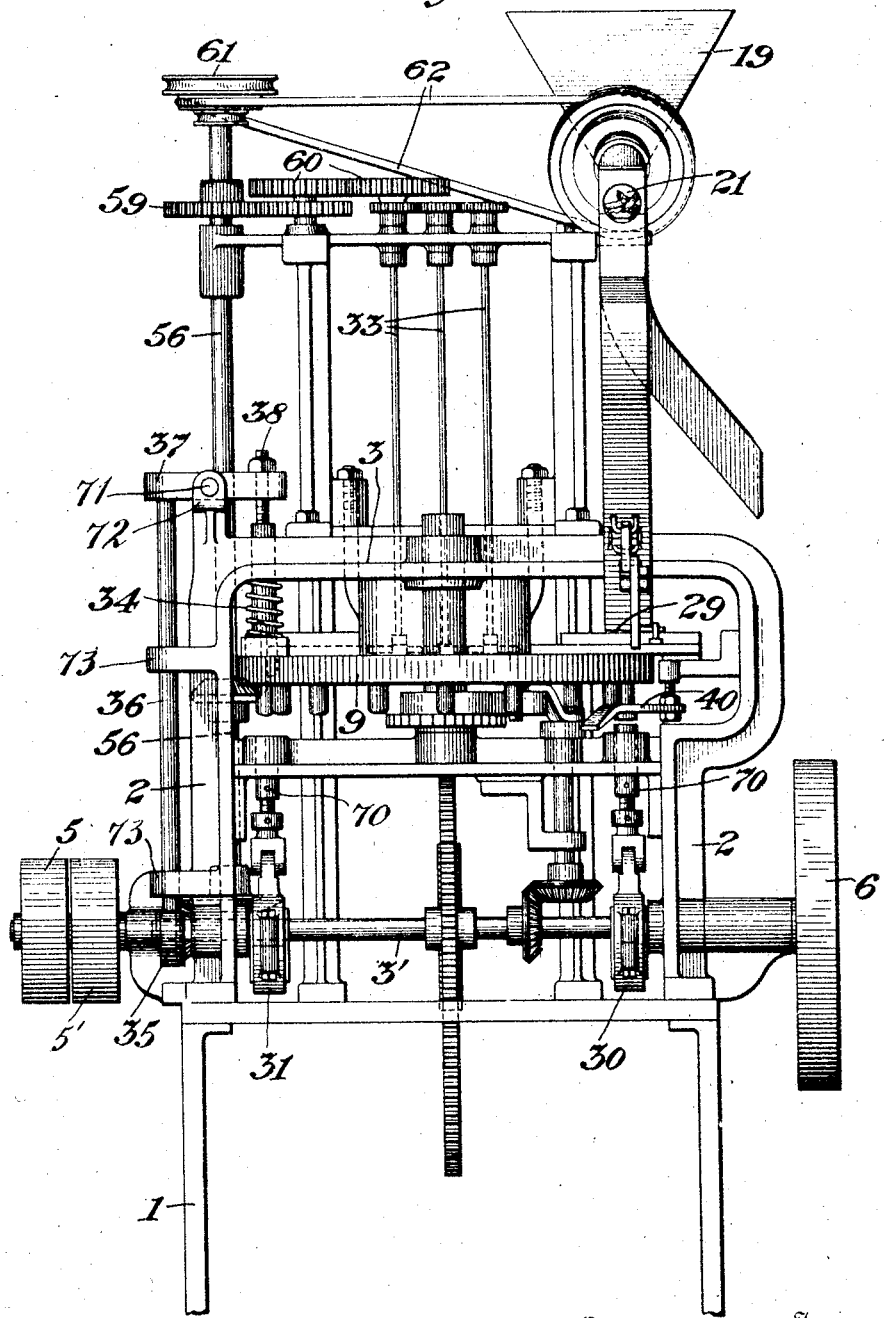

T. B. WILCOX.
APPARATUS FOR THE MANUFACTURE OF BOTTLE CAPS.
APPLICATION FILED AUG. 8, 1908.

991,581.

Patented May 9, 1911.

5 SHEETS—SHEET 1.

T. B. WILCOX.
APPARATUS FOR THE MANUFACTURE OF BOTTLE CAPS.
APPLICATION FILED AUG. 8, 1908.

991,581.

Patented May 9, 1911.
5 SHEETS—SHEET 2.

Witnesses:
Chas. F. Clagett
Theo. H. Brown

Theodore B. Wilcox, Inventor
By his Attorney
George H. ...

T. B. WILCOX.
APPARATUS FOR THE MANUFACTURE OF BOTTLE CAPS.
APPLICATION FILED AUG. 8, 1908.
991,581.
Patented May 9, 1911
5 SHEETS—SHEET 3.
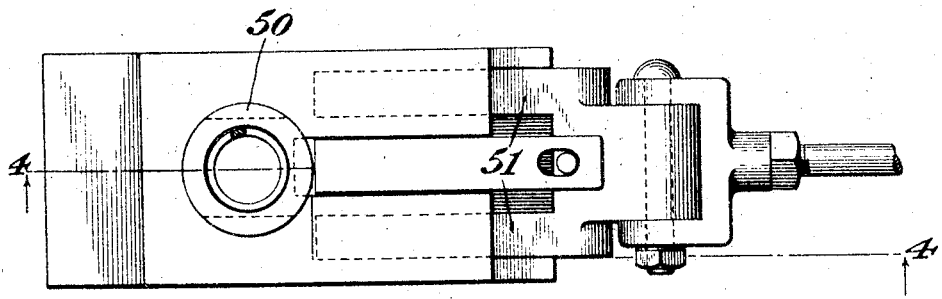
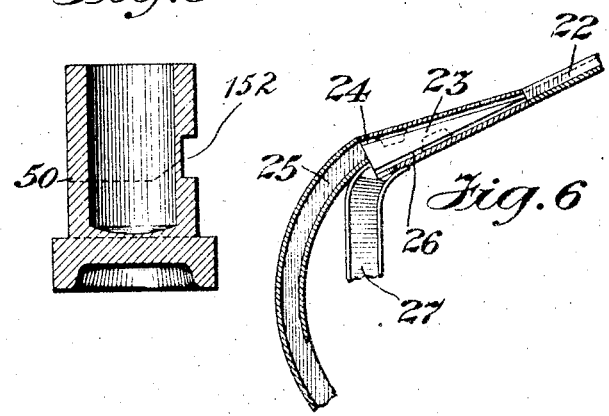
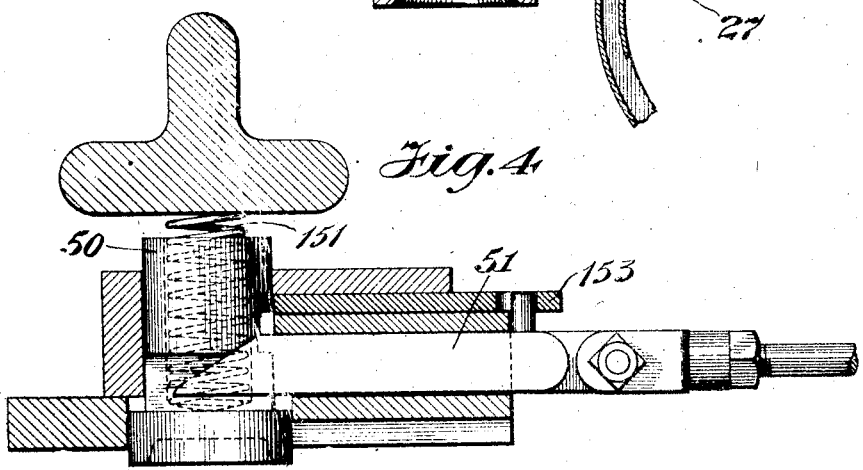

T. B. WILCOX.
APPARATUS FOR THE MANUFACTURE OF BOTTLE CAPS.
APPLICATION FILED AUG. 8, 1908.
991,581.
Patented May 9, 1911.
5 SHEETS—SHEET 4.
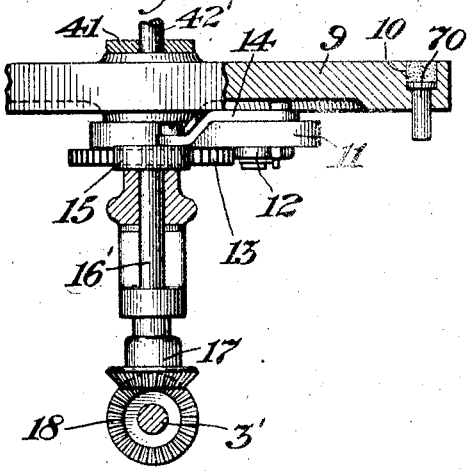
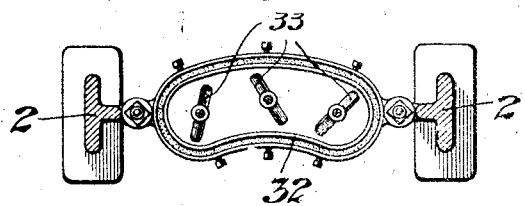
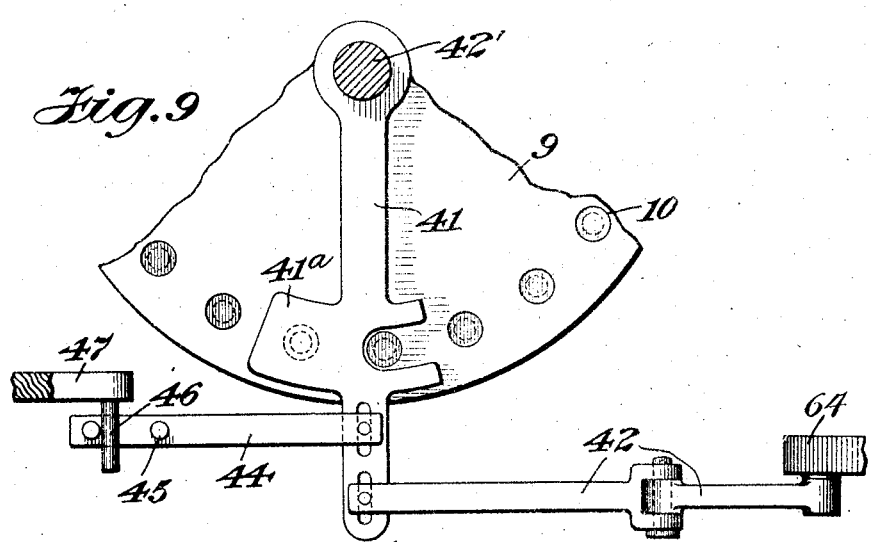

T. B. WILCOX.
APPARATUS FOR THE MANUFACTURE OF BOTTLE CAPS.
APPLICATION FILED AUG. 8, 1908.

991,581.

Patented May 9, 1911.

5 SHEETS—SHEET 5.

UNITED STATES PATENT OFFICE.

THEODORE B. WILCOX, OF NEWARK, NEW JERSEY, ASSIGNOR TO THE HASTINGS DEVELOPING COMPANY, OF NEW YORK, N. Y., A CORPORATION OF NEW YORK.

APPARATUS FOR THE MANUFACTURE OF BOTTLE-CAPS.

991,581. Specification of Letters Patent. Patented May 9, 1911.

Application filed August 8, 1908. Serial No. 447,518.

*To all whom it may concern:*

Be it known that I, THEODORE B. WILCOX, a citizen of the United States, and resident of Newark, county of Essex, State of New Jersey, have invented certain new and useful Improvements in Apparatus for the Manufacture of Bottle-Caps, of which the following is a specification.

My invention relates to apparatus for the manufacture of bottle caps in accordance with a novel process invented by me and disclosed in my application Serial Number 424,919, filed April 3, 1908. In carrying out this process, the usual metallic cap is employed as a matrix and the material which is to form the filling of the cap and ultimately to make a good seal surface for the top of a bottle,—this material, mixed with some adhesive substance, as described in my said application, is pressed by a die or plunger into the said matrix, whereupon the bottle cap is at once completed and ready for use.

The invention is also applicable to the manufacture of bottle caps in which the metallic portion of the cap is itself adapted to retain the filling or padding either by means of an adhesive substance, in the said metallic portion or by friction.

The machine, in its general features, could also be used in briquet making and like arts.

It is the object of the present invention to provide a machine whereby bottle caps can be made in large numbers by a single piece of apparatus and without needlessly complex mechanical operations. One feature of the operation of my novel machine is that of feeding the metallic caps selectively from a hopper in which they are deposited so that caps which are turned in one direction as they exit from the hopper are passed through the machine in a proper position to be filled, while reversed or inverted caps are rejected or cast out of the machine before they reach the filling point.

As one feature of the structure, I may mention a circular table or platen having openings or perforations near its periphery for receiving the substance which is to form the pads or cushions of the caps.

Other special features of the invention will appear further on.

My invention is illustrated in the accompanying drawings in which—

Figure 2:
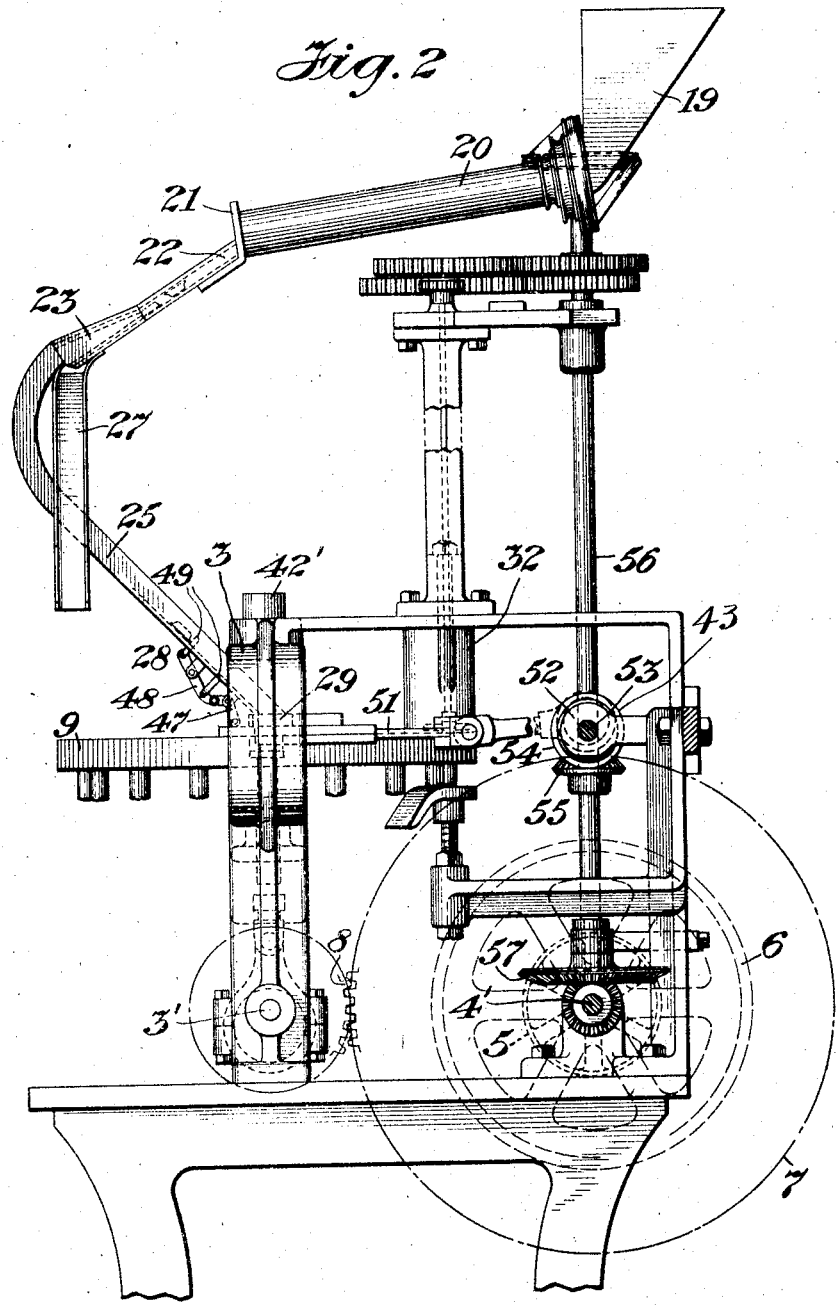
Figure 10:
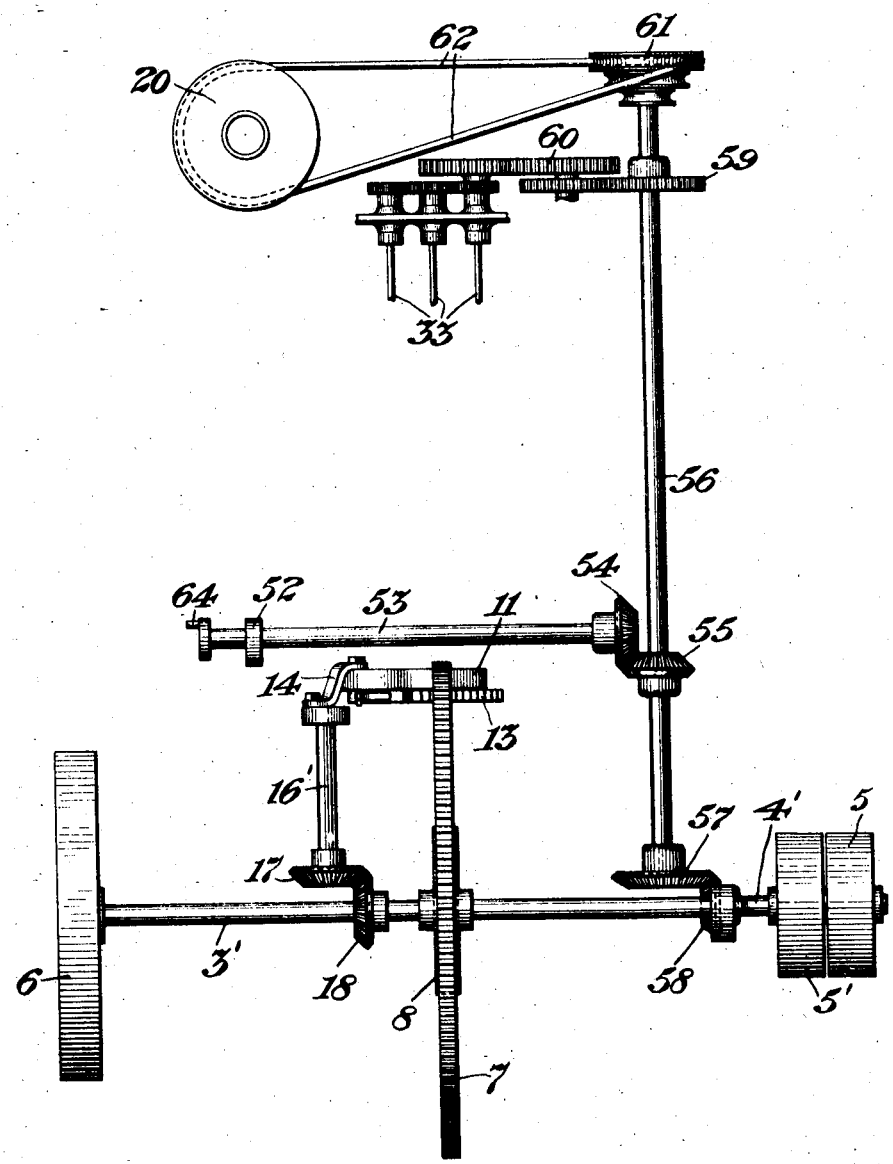

Figure 1 is a rear elevation of my machine; Fig. 2 is a side elevation, partly in section, showing the features of the main driving gearing; Fig. 3 is a detail of the actuating means for a cap placer or positioner which I use in my machine; Fig. 4 is a vertical sectional view on the line 4—4 of Fig. 3, showing a section of the same device; Fig. 5 is a detail vertical sectional view of the positioner proper; Fig. 6 is a detail sectional view of the assorting device for determining the position of the caps to be fed; Fig. 7 is a detail view of the transmission and mechanism for actuating progressively the table or platen; Fig. 8 is a plan of the mixing chamber showing in cross section its means of attachment to the frame; Fig. 9 is a plan in detail of a positioning device for the caps upon receiving their final pressure. This view also shows the connection for the releasing mechanism in the cap feeding chute; and Fig. 10 is a skeleton view of the different actuating mechanisms in detail without regard to the frame.

Referring to the first figure of the drawings, 1 is a frame on which is mounted a skeleton frame work, 2, having cross connections, 3. In the frame considered as a whole are journaled two shafts 3' and 4', the latter being the driving shaft and carrying the usual tight and loose pulleys, 5 and 5', and also the usual fly-wheel, 6. On the driving shaft 4' is mounted a gear-wheel, 7, which engages with a smaller gear-wheel, 8, on the shaft 3', which by these means receives its motion from the shaft 4'.

One of the central features of construction in my machine is a table or platen, 9, provided near its periphery with openings or perforations, 10, 10, (see Figs. 7 and 9) for receiving the compressible filling, padding or cushioning, and preferably adhesive material later to be introduced into the caps. This platen 9 receives from the shaft 3', through intermediate devices, an intermittent motion tending to rotate the said platen. The intermediate mechanism is shown in Figs. 7 and 10 as consisting of a bevel gear, 18, on the shaft 3', a corresponding bevel gear, 17, on a short vertical shaft, 16', a crank, 15, carried on the upper end of the said shaft 16', a link, 14, pivoted to the said crank, a ratchet arm, 11, a dog, 12, and a ratchet wheel, 13, the latter being secured to an upwardly extending shaft, 42', to which the platen 9 is also attached. The shaft 42' is mounted in the frame work 3, as shown in Fig. 2.

Above the platen 9 and placed so close thereto that its lower end is touched, or approximately so, by the platen in its rotation, is a mixer, 32, having, in this instance, three agitators, 33, 33, 33, for thoroughly mixing the ingredients of the material which is to be compressed within the caps. These agitators are driven from the shaft 4' through a bevel gear, 58, coöperating with a similar gear, 57, on an upright long shaft, 56, which carries a gear wheel, 59, engaging one of a series of gears, 60, whereby the shafts of the agitators 33 are rotated. Such being the relations between the mixer 32, the agitators 33 and the platen 9, the latter, scraping along the bottom of the mixer, gathers into the perforations 10, 10, charges of the material to be compressed and carries them around in its rotation. By reason of the more or less fluid character of the mixed materials, the mixture will tend to enter the perforations 10, 10 under the influence of gravity. It should be understood that every perforation is fitted with a plunger, 70, set into it, as clearly illustrated in Fig. 7. At a certain point in its rotation each charge is brought into line with a stop, 34, adjustable up or down by means of a set screw, 38, in a rocker arm, 37, pivoted at 71 in a bracket, 72, on the frame work 3. The rocker arm 37 is itself adjustable by means of a rod, 36, whose position within brackets, 73, 73, on the frame work 2 is determined by a cam, 35, all as shown at the left in Fig. 1. When the charge has been brought to the position indicated, it receives through a cam, 31, on the shaft, acting on one of the plungers, 70, an initial compression, the degree of which may obviously be graduated at will. This compression takes place within the appropriate opening and without any relation to the caps wherein the final pressure is to take place at a point 180 degrees distant from the point of initial compression. Before describing this final compression, it will be best to state in detail how the caps are brought to their proper place above or upon the platen.

The unfilled caps are first thrown into a hopper, 19, at the front and upper part of the machine. Thence they are fed into a cylinder, 20, which is revolved by means of one or the other of a series of belt sheaves, 61, at the upper end of the shaft 56 through a belt, 62, (see Fig. 10). The cylinder 20 has an open end, 21, which delivers the caps in a correct or an inverted position, as the case may be, to a chute, 22, leading to the selecting or assorting device, 23, shown in Figs. 1, 2 and 6. If a cap is properly presented, its edges take the slot, 24, and the cap is delivered into a feed chute, 25, to be afterward completed by the machine. If, on the other hand, a cap is improperly presented, it takes the lower slot, 26, and is fed into a discard chute, 27, falling thence upon the floor or into a receptacle (not shown) to be again fed into the hopper. In the lower portion of the chute 25, which is above the platen 9 is a stop device designated, as a whole, as 28, which interrupts the feed of the correctly positioned caps before they are fed upon the platen 9.

As each cap is delivered above the platen, it is brought to the correct position to receive a charge (already partly compressed) from one of the openings 10. In falling into place, the cap drops into a yoke shaped opening in a pivoted arm 41 loosely mounted on the shaft 42'. In order to move the cap into the exact position which it should occupy over one of the charged openings 10, the pivoted arm or lever 41 is moved forward to the limit of its motion in one direction whereupon the cap is properly placed for the purpose of receiving the charge. In performing this action the lever 41 brings the cap under the bottom of a positioning plug, 50, shown in detail in Fig. 4. The plug 50 is itself adjustable in a vertical direction through the agency of a reciprocating bifurcated cam, 51 (see Figs. 3, 4 and 5), which cam receives its motion from a cam, 43, mounted upon a cross shaft, 53, carrying on one end a bevel gear, 54, meshing with a companion gear, 55, which is pivoted upon a vertical shaft, 56. The latter receives its motion through a large bevel gear, 57, and a small bevel gear, 58, upon the shaft 4'.

As shown more particularly in Figs. 3 and 4, the positioning plug 50 is notched on opposite sides and the bifurcated cam 51 is adapted to lift the plug or permit it to be pressed downward into the position illustrated in Fig. 4 by means of a spring 151. The said plug is also notched at 152 to receive a catch, 153, for holding the plug in its uppermost position when the cam has been moved forward to lift the plug. It should be understood that at the time when a cap descends into the fork or yoke of the arm 41 the said positioning plug 50 is in a raised position, being held there by the catch 153. Accordingly, the cap is free to move under the plug until it has been brought into position by the arm 41. The next operation consists in releasing the positioning plug for the purpose of pressing the cap down upon the partly compressed material in an opening 10 and also for moving forward the arm 41 until an apron, 41*, formed on the said arm is moved to a position over the cap. At this moment the cap is at a point, 29, diametrically opposite the point of initial compression already mentioned and at this last named point the final pressure is exerted by means of a cam 30 on the shaft 3' acting upon one of the plungers 70 and aided by an adjustable spring 40. Afterward the arm 41 is moved backward to receive within its fork another cap and this reciprocating motion is repeated with every cap.

The means for reciprocating the arm or lever 41 consists of a cam, 64, carrying a crank pin which imparts motion to a link, 42, having a pin and slot connection with the lever 41, as shown in Fig. 9. Also connected to the lever 41 by a pin and slot connection is a rearwardly extending arm, 44, carrying a pair of upright pins, 45, between which is inserted a horizontally extending pin, 46, fastened upon the bell crank lever, 47. This bell crank lever 47 in turn is pivoted to a rocker arm, 48, which carries on each side of its pivotal point a pin, 49, extending substantially vertically, which controls the feed of the caps in the chute 25.

I claim as my invention:

1. In a compressing machine for making bottle caps, a table or platen provided with openings or perforations, means for holding, mixing and bringing to a plastic or semi-liquid state the compressible materials that the same may enter said openings, means for rotating said table beneath said holder and gathering the said compressible material therefrom, means for bringing empty bottle caps into line with said openings, means for initially compressing said compressible material within said openings, and means for finally compressing the same within the caps.

2. In a compressing machine for making bottle caps, a table or platen provided with openings or perforations, a plunger in each of said openings, means for holding, mixing and bringing to a plastic or semi-liquid state the compressible materials for filling or packing the caps that the same may enter said openings, means for rotating said table beneath said holding means and gathering the said compressible material therefrom, means for bringing empty bottle caps into line with said opening, means for actuating said plungers to initially compress said plastic compressible material within said openings, and means for finally compressing said material within said caps.

3. In a compressing machine for making bottle caps, a table or platen provided with openings or perforations, a plunger in each of said openings, means for holding, mixing and bringing to a plastic or semi-liquid state compressible material that the same may enter said openings, means for rotating said table, means for actuating said plungers to initially compress said plastic material within said openings, means for bringing empty caps into line with said openings, a positioning plug for successively pressing the caps upon the partly compressed material in said openings, and means for finally compressing said material into said caps.

4. In a compressing machine for making bottle caps, a table or platen provided with openings or perforations, means for mixing and bringing to a plastic or semi-liquid state compressible material to enter said openings, means for rotating said table, means for initially compressing said material within said openings, means for bringing empty caps into line with said openings, a positioning plug for successively pressing the caps upon the partly compressed material in said openings, and means for backing the caps with a resisting plate at the moment when final compression is applied to the material.

5. In a compressing machine for making bottle caps, a suitable hopper for receiving empty caps, an inclined rotatable chute section connected to said hopper for delivering said caps to a fixed chute section in either an upright or reversed position, a selecting device at the entrance of the fixed chute section provided with an upper and a lower guide slot to receive the flaring edge, respectively, of a reversed or upright bottle cap, one of said slots leading to the point where the caps are to be completed, and the other slot leading away from the machine.

6. In a compressing machine for making bottle caps, a rotatable platen or table provided with openings or perforations to receive a plastic compressible material for inserting in the caps, means for placing said caps over said openings, a suitable hopper for receiving empty caps, an inclined rotatable chute section connected to said hopper for delivering said caps to a fixed chute section in either an upright or reversed position, a selecting device at the entrance of the fixed chute section provided with an upper and a lower guide slot to receive the flaring edge, respectively, of a reversed or upright bottle cap, one of said slots leading to the point where the caps are to be completed, and the other slot leading away from the machine.

7. In a compressing machine for making bottle caps, a rotatable table or platen having openings for containing plastic compressible material to fill or pack bottle caps, a plunger in each of said openings, a reciprocating positioning device for placing individual caps over said openings, means for reciprocating said device, means for feeding empty caps to said device, and means for actuating said plungers to compress the plastic material into said caps.

8. In a compressing machine for making bottle caps, a rotatable table having openings for containing plastic compressible material to fill or pack bottle caps, a plunger in each of said openings, a reciprocating positioning device for placing individual caps over said openings, means for reciprocating said device independently of the movement of the table or platen, means for feeding empty caps to said device, means for actuating said plungers to compress the plastic material in said openings into the caps, and means associated with the positioning device for resisting the force of compression applied to the compressible material.

Signed at New York, in the county of New York, and State of New York, this 7th day of August, A. D. 1908.

THEODORE B. WILCOX.

Witnesses:
 THOS. H. BROWN,
 HARVEY F. MILLER.